United States Patent [19]

Jacobs

[11] Patent Number: 4,726,163

[45] Date of Patent: Feb. 23, 1988

[54] PRESTRESSED PLASTIC BODIES AND METHOD OF MAKING SAME

[76] Inventor: William A. Jacobs, 711 Notre Dame Ave., Edwardsville, Ill. 62025

[21] Appl. No.: 742,873

[22] Filed: Jun. 10, 1985

[51] Int. Cl.[4] ........................ B28B 1/30; B32B 13/06; E04C 5/01; E04C 5/03

[52] U.S. Cl. .................................... 52/223 R; 29/452; 52/230; 52/741; 264/228; 264/229; 264/333; 264/40.6; 428/349; 428/379; 428/390

[58] Field of Search .................... 264/228, 229, 31-35, 264/69, 71, 72, 231, 234, 333, 332, 27, 40.6; 52/223 R, 224, 230, 741, 223 L; 425/111; 29/452; 156/53; 428/349, 390, 379

[56] References Cited

U.S. PATENT DOCUMENTS

| | | | |
|---|---|---|---|
| 2,319,105 | 5/1943 | Billner | 264/228 X |
| 2,329,189 | 9/1943 | Dill | 94/4 |
| 2,414,011 | 1/1947 | Billner | 264/228 X |
| 2,727,293 | 12/1955 | Barnett et al. | 264/27 |
| 3,422,586 | 1/1969 | Parma | 52/230 |
| 3,491,431 | 1/1970 | Pewitt | 264/228 X |
| 3,552,074 | 1/1971 | Rajchman | 264/228 X |
| 3,676,968 | 7/1972 | Campbell | 52/223 R |
| 3,960,995 | 6/1976 | Kourkene | 264/27 |
| 4,499,136 | 2/1985 | Nakamura et al. | 428/349 X |

FOREIGN PATENT DOCUMENTS

| | | | |
|---|---|---|---|
| 547521 | 5/1977 | U.S.S.R. | 264/228 |
| 547522 | 5/1977 | U.S.S.R. | 264/228 |

*Primary Examiner*—Jeffery Thurlow

*Assistant Examiner*—Leo B. Tentoni

*Attorney, Agent, or Firm*—Senniger, Powers, Leavitt and Roedel

[57] ABSTRACT

A method of producing a compressive stress in a mass comprised of plastic material having a tendon therein, at least a portion of the length of the tendon being contained in thermoplastic material within the mass, the method comprising the steps of heating the tendon to a temperature sufficient to soften the thermoplastic material in an annular region surrounding the tendon, applying a tractive force to the heated tendon, thereby placing the heated tendon under tensile stress, and securing the heated tendon to the mass in a manner that causes the tensile force in the tendon to produce a compressive stress in the mass and prestressed plastic bodies produced according to this method.

14 Claims, 5 Drawing Figures

PRESTRESSED PLASTIC BODIES AND METHOD OF MAKING SAME

BACKGROUND OF THE INVENTION

This invention relates generally to reinforced plastic bodies and more particularly to posttensioned cement and concrete slabs.

Prestressing of reinforced concrete is known to increase its resistance to shearing and tensile stresses. Conventionally, concrete has been prestressed by either of two methods: pretensioning and posttensioning.

In pretensioning, the prestressing force is applied by means of high-strength steel wires or tendons which are arranged end to end between two fixed anchorages. The tendons are stretched to a high state of stress and the molds are filled with fresh concrete. After the concrete has hardened, the tendons are released from the anchorages and the stress in the tendons is transferred to the concrete, thereby placing the concrete under compression. However, difficulties in applying the tensile stresses and in regulating the magnitude of the forces which are ultimately imposed upon the hardened body has prevented pretensioning from being a completely satisfactory technique of prestressing concrete.

By contrast, in posttensioning the concrete is allowed to harden before the tendons are stressed. In order for the tendon to be stressed, however, it is necessary that the tendon be free to move in the axial direction with respect to the hardened concrete at the time of tensioning.

In one posttensioning method, therefore, the tendons are coated with grease or some other petroleum product to prevent them from bonding to the concrete. Thus, after the concrete hardens, the tendons can still move relative to the concrete when mechanically tensioned to place the concrete in compression. However, this method has been unsatisfactory for several reasons. The void formed between the tendon and the concrete by the grease provides a pathway for transmission of corrosive materials which may attack the tendon. Also, since the tendon is not bonded along its length, any failure will cause a total loss of prestressing effect of the tendon.

In another posttension method, conduit consisting of metal or rubber sleeves is placed in the forms and the concrete is cast around them. After the concrete hardens, the tendons are threaded through the sleeves and tensioned using special jacks anchored against the ends of the concrete member, which itself forms the abutment. After the concrete has hardened and the tendon is tensioned, the conduit is filled with grout. While this method overcomes some of the difficulties associated with pretensioning methods, it has not been completely satisfactory. Sealing the conduit with grout has been particularly inconvenient. In addition, any voids in or failure of the grout provides a pathway for transmission of corrosive materials which may attack the tendon.

In yet another posttensioning method, it has been proposed to coat the tendon with a low melting point or thermoplastic material. After the concrete is cured, the tendon is heated to a temperature that causes the coating to soften and the tendon to thermally expand in the axial direction. After the tendon is heated to the desired temperature, the ends of the tendon are secured to the concrete mass and the contraction of the tendon due to cooling places the concrete in compression. See, e.g, U.S. Pat. No. 2,414,011 of Karl P. Billner issued on Jan. 7, 1947, in which it is also said that the coating may be omitted where the body to be prestressed comprises a thermoplastic material. While this method overcomes the problems associated with the formation of voids in a grout, the amount of tensioning that may be achieved by this method is limited by the maximum temperature that the tendon may be subjected to without adversely affecting the concrete or the reinforcing characteristics of the tendon. Accordingly, this method has not won wide acceptance; with ordinary working materials, the temperature required to achieve the necessary thermal expansion of the tendon adversely affects the tendon and the concrete.

Consequently, a need has remained for a method for prestressing plastic bodies that will permit a degree of tensionsing greater than that which can be achieved through thermal expansion of the tendon alone, that will be resistant to corrosive attack and that will be convenient to use.

SUMMARY OF THE INVENTION

Among the several objects of the invention, therefore, may be noted the provision of a method of posttensioning plastic bodies; the provision of such a method which is particularly well suited for cement and concrete slabs used in the construction of roads, buildings and the like; the provision of such a method wherein curing or aging of the plastic material does not result in the formation of a significant amount of voids between the tendon and the plastic body that could provide a pathway for transmission of corrosive materials that attack the tendon; the provision of such a method wherein upon heating, the tendon is free to move in the axial direction with respect to the plastic body; the provision of such a method wherein the tendon is stressed in an amount greater than that which may be obtained through thermal expansion of the tendon alone, without adversely affecting the plastic material surrounding the tendon or the reinforcing characteristics of the tendon; the provision of such a method wherein after tensioning, the tendon or a tension element comprising the tendon, is bonded along its length to the plastic body, thereby substantially eliminating the risk of formation of any voids along the length of the tendon that could provide a pathway for transmission of corrosive materials which could attack the tendon; and the provision of devices for the prestressing of plastic bodies.

Briefly, therefore, the present invention is directed to a method of producing a compressive stress in a mass comprised of plastic material and having a tendon therein, at least a portion of the length of the tendon being contained in thermoplastic material within the mass. The method comprises the steps of heating the tendon to a temperature sufficient to soften the thermoplastic material in an annular region surrounding the tendon, applying a tractive force to the heated tendon thereby placing the heated tendon under tensile stress, and securing the heated tendon to the mass in a manner that causes the tensile force in the tendon to produce a compressive stress in the mass.

The present invention is also directed to a tension element for prestressing a mass of plastic material. The element comprises an elongate tendon encased in a solid mantle of thermoplastic material, the lateral surface of the mantle having tension transmitting means thereon for transmitting the tensile force in the tendon to the mass. In addition, the thermoplastic material of the mantle has a melting temperature substantially less than the melting temperature of the tendon. Thus, when the tendon is heated to a temperature in excess of the melting temperature of the thermoplastic material of the mantle, the mantle softens in an annular region surrounding the tendon thereby permitting the tendon to move freely in the axial direction with respect to the tension transmitting means.

The present invention is further directed to a prestressed plastic body comprising a thermoplastic material and a tension element comprising a tendon. In this prestressed plastic body, the tendon is in contact with the thermoplastic material within the plastic body and in addition, the tendon is under a tensile stress in excess of eighty percent of the yield stress of the tendon.

The present invention is further directed to a method for producing a prestressed plastic body and to the body thereby produced. The method comprises the steps of pouring a fluid thermoplastic material about a tendon, allowing the thermoplastic material to harden about the tendon and heating the tendon to a temperature sufficient to soften the thermoplastic material in an annular region surrounding the tendon. After the thermoplastic material has softened, a tractive force is applied to the heated tendon thereby placing the heated tendon under tensile stress, and the heated tendon is secured to the body in a manner that causes the tensile force in the tendon to produce a compressive stress in the body.

The present invention is also directed to a prestressed plastic body comprising a plastic material containing a tension element. In this plastic body, the tension element comprises a tendon encased in a solid mantle of thermoplastic material, the lateral surface of the mantle having tension transmitting means thereon, and the thermoplastic material having a melting temperature substantially less than the melting temperature of the tendon.

The present invention is also directed to a method for producing a prestressed plastic body and the prestressed body thereby produced. The method comprises the steps of pouring a fluid plastic material about a tension element, the tension element comprising a tendon encased in a solid mantle of thermoplastic material, the lateral surface of the mantle having tension transmitting means thereon, allowing the plastic material to harden about the tension element, and heating the tendon to a temperature sufficient to soften the thermoplastic material in an annular region surrounding the tendon. After the thermoplastic material is sufficiently softened, a tractive force is applied to the heated tendon, thereby placing the heated tendon under tensile stress, and the heated tendon is secured to the body in a manner that causes the tensile force in the tendon to produce a compressive stress in the body.

Other objects and features will be in part apparent and in part pointed out hereinafter.

DESCRIPTION OF THE PREFERRED EMBODIMENTS

Figure 1:
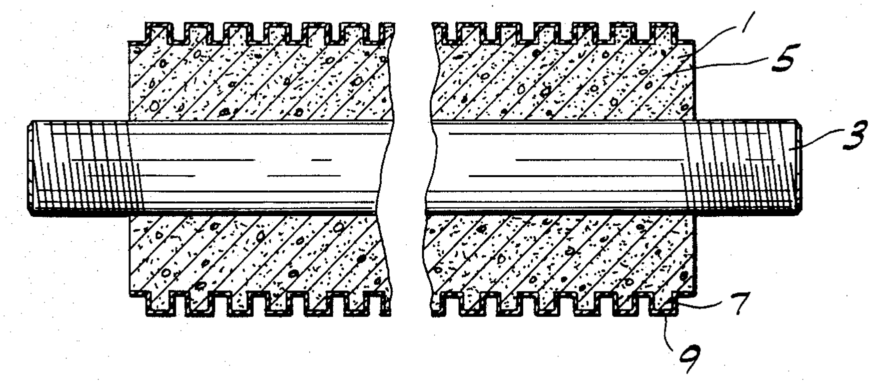
FIG. 1 is a sectional elevation of a sheathed tension element of the present invention.

In accordance with the present invention, a novel process has been discovered for posttensioning a body comprising a mass of plastic material. More particularly, it has been found that when the plastic material has a tendon therein, and the tendon is contained in a thermoplastic material within the body, the body may be posttensioned by heating the tendon until the thermoplastic material in an annular region surrounding the tendon softens sufficiently to permit the tendon to move freely in the axial direction with respect to the body. When the thermoplastic material is sufficiently softened, a tractive force is applied to the tendon until the desired tensile stress is achieved. Thereafter, the tendon is secured to the plastic body in a manner that causes the tensile force in the tendon to produce a compressive stress in the body. Plastic bodies posttensioned by this process may be placed under compressive stresses greater than that which may be achieved through thermal expansion of the tendon alone.

In accordance with the present invention, at least a portion of the length of the tendon is contained in thermoplastic material within the body. Preferably, the tendon is in contact with a thermoplastic material substantially along the length of the tendon through the plastic body. Most preferably, the tendon is embedded in a mantle of thermoplastic material, the length of the mantle being coextensive with the length of the tendon through the body.

Significantly, the method of the present invention may be used to posttension plastic bodies formed of a plastic mass that is non-thermoplastic in nature. Plastic bodies of this type may be formed by placing a prefabricated tensioning element comprising a tendon encased in a mantle of thermoplastic material in the forms for the plastic body, pouring the plastic material about the tensioning element and allowing the plastic material to harden. Thereafter, the plastic body may be posttensioned as outlined above. Thus, a body comprising one or more plastic materials such as any of the various grades of Portland cement or concrete, and the like may be posttensioned according to the method of the present invention. Applications of the method of the present invention include, therefore, the prestressing of concrete slabs for roads, structural members, building foundations, curbing, gutters, pipes and other cast products where the concrete material consists of any of the various grades of Portland cement.

The tendon extends through the plastic body in a manner that permits the tensile stress of the tendon to be transmitted to the body. The location of the tendon within the plastic body may be similar to the location of reinforcing cables or rods used in a conventional concrete structure. In a preferred embodiment, the ends of the tendon project outwardly beyond opposite surfaces of the body and are secured to the ends or other opposite outside surfaces of the plastic body, whether the tendon traverses the body longitudinally, latitudinally or otherwise. Alternatively, the tendon may comprise a doubled tendon having a looped end wherein a portion, preferably a major portion, of the length of the tendon is embedded in thermoplastic material, and the looped end is embedded in a nonthermoplastic material contained in the plastic body. This arrangement permits the ends of the tendon to be secured to the same end of the concrete in applications where it is not practical to secure the ends of the tendon to the opposite surfaces of the concrete. See, e.g., the prestressing system described by U.S. Pat. No. 3,422,586 issued to Domenico Parma on Jan 21, 1969. Other particular arrangements of the tendon with respect to the plastic body will be apparent to those skilled in the art.

The tendon has a melting temperature substantially greater than the melting temperature of the thermoplastic material which surrounds it, and may be in the form of a stretchable cable or wire rope, but may also take the form of one or more wires, reinforcing bars, pipes or rods. The use of a cable is preferred because of its flexibility, resiliency and strength. A most preferred tendon consists of a standard 7 strand one-half inch diameter steel tendon having a crosssectional area of 0.153 square inches.

The material in which the tendon is contained comprises a thermoplastic material such as sulfur concrete, sulfur, and other various thermoplastic materials. Preferably, the tendon is contained in a mantle of thermoplastic concrete, a material that comprises an aggregate mix dispersed in a thermoplastic cement matrix, the aggregate imparting strength to the thermoplastic material. Sulfur concrete, which comprises sulfur as the binder and a mixture of aggregates is a preferred thermoplastic material, because of its extreme corrosion resistance, high physical strength, high fatigue resistance, low water permeability and the ability to be poured in sub-zero temperatures without freezing problems. Additionally, the properties of sulfur concrete can be tailored for specific application, e.g., where toughness or impact resistance may be required, or for use in chemical tanks and floors where continuous exposure to acids or alkalis may occur. Various sulfur concrete compositions are disclosed in the following U.S. Pat. Nos.: 4,311,826; 4,348,313; 4,188,230; 4,308,072; 4,376,830 and 4,376,831. Particularly preferred sulfur concrete compositions for use in accordance with the present invention are disclosed in U.S. Pat. Nos. 4,025,352 and 4,293,463. Most preferred sulfur concrete compositions of the present invention comprise about 10 wt % to about 17 wt % sulfur cement, about 75 wt % to about 83 wt % aggregates and about 5 wt % to about 12 wt % fines. The aggregate of this most preferred sulfur concrete composition is a mix of rock and sand material comprising approximately 25 wt % to 30 wt % of material having a particle size less than ⅜ inch but greater than #4 screen, approximately 15 wt % to 20 wt % of material having a particle size less than #4 screen but greater than #8 screen, approximately 10 wt % to 15 wt % of material having a particle size less than #8 screen but greater than #16 screen, approximately 10 wt % to 15 wt % of material having a particle size less than #16 screen but greater than #30 screen and approximately 20 wt % to 30 wt % of material having a particle size less than #30 screen but greater than #100 screen. The fines of the most preferred sulfur concrete composition is a fine filler of silica dust or flyash having a particle size less than about #200 screen. All screen sizes referred to immediately above are U.S. sieve sizes.

In accordance with the process of the present invention, the tendon is heated to a temperature and for a period sufficient to soften the thermoplastic material in an annular region surrounding the tendon. As the temperature of the tendon nears the melting point of the thermoplastic material, the thermoplastic material begins to melt, thus forming a melt zone in the annular area surrounding the tendon. Preferably, the heating of the tendon is controlled so that the annular thickness of the melt zone does not exceed one-half the mean lateral dimension of any large aggregate in the thermoplastic material surrounding the tendon. Additionally, the heating of the tendon is preferably controlled so that the generation of voids resulting from the formation of gases is kept at a practical minimum.

Where the thermoplastic material surrounding the tendon comprises sulfur cement prepared according to the disclosure of U.S. Pat. Nos. 4,025,352 or 4,293,463, the tendon is heated to a temperature in the range of about 245° F. to about 325° F. for a period sufficient to permit the tendon to move freely in the axial direction. Preferably, the temperature of the tendon will be controlled so that the temperature in the melt zone does not exceed 325° F.; temperatures in excess of 325° F. may harm many of the plasticizers conventionally used in sulfur cement formulations or, alternatively, may result in the formation of gases which will create voids in the material. Most preferably, the tendon is heated to a temperature in the range of about 275° F. to about 290° F. As the sulfur cement begins to soften, traction is applied to the tendon, by a special jack or other similar means anchored against the end of the body, until the desired amount of tensile stress is achieved in the tendon. Preferably, the tendon is stressed until the tendon is stretched axially. More preferably, the tendon is stressed until approximately eighty percent of the mechanical yield stress of the tendon is achieved. After the desired stress is achieved, the tendon is anchored to the body in a manner that transfers the tensile stress to the body.

The tendon may be heated through the application of an electric current from a conventional source such as an arc welding power supply. Where the thermoplastic material consists of sulfur concrete and the tendon consists of a standard 7 strand one-half inch steel cable, the application of about 175–250 amperes can free the tendon in about 10 to 15 minutes. Preferably, the current density in the cable is maintained within the range of about 1000 to about 1500 amps/in$^2$. A convenient method for determining when the sulfur concrete begins to soften consists of rubbing sulfur on the exposed end of the cable and observing when the sulfur begins to melt. For safety reasons, it is preferred to insulate any reinforcing bar contained by the plastic body from the tendon.

Some layouts make it practically impossible or inconvenient to make an electrical connection on both ends of the tendon. In this case, a group of tendons can be electrically connected to each other near the inaccessible ends thereof, and thus allow electrical connection at the accessible end of the slab. If both connections are made on one end of the slab, however, care must be taken to prevent shortcircuits by electrically insulating the tendons from the reinforcing bar, and from the other tendons as well throughout the bulk of the mass.

Where the tendon comprises a pipe, the tendon may be heated by passing steam through the pipe until the thermoplastic material surrounding the pipe is softened. The pipe may then be tensioned and anchored to the body in accordance with the method of the present invention.

The present invention is also directed to tension elements for posttensioning a mass of plastic material, particularly where the mass of plastic material contains a significant amount of non-thermoplastic material. The tension element for this application comprises a tendon encased in a mantle of thermoplastic material. Preferably the mantle has a thickness sufficient to contribute to the strength of the plastic body to be posttensioned, to protect the tendon from corrosion, to protect the tendon from mechanical damage during handling and placement and to decrease the risk of melting the entire thickness of the mantle as a result of error during the post-tensioning process. If all of the mantle were melted during the posttensioning process, there is a significant risk that bubbles or voids would form at the interface between the mantle and the mass of plastic material. Where the mantle of thermoplastic material comprises an aggregate mix, it is most preferred that the radius of the mantle be at least about 3.3 times the size of the largest aggregate of the mix.

Preferably, the mantle also comprises tension transmitting means on the lateral surface of the mantle in order to facilitate the transmission of tension from the tension element to the plastic body. Where the mantle of thermoplastic material comprises an aggregate mix, irregularities in the lateral surface of the mantle resulting from the presence of aggregate such as aggregate projecting outwardly beyond the lateral surface of the mantle may comprise the tension transmitting means. Alternatively, the tension transmitting means may comprise ridges, corrugations or any other means that facilitates the transmission of tension. Additionally, the tension element may have a sheath of insulating material on the lateral surface of the mantle. Insulating materials are particularly beneficial where there is a need to protect the tendon from corrosive elements or where the thermoplastic material of the mantle is brittle and there is a risk that the mantle may be broken through handling. Preferred insulating materials include heat shrinkable materials such as polyethylene tape and the like.

FIG. 1 depicts a sheathed tension element 1 of the present invention. The sheathed tension element 1 comprises a tendon 3 and a mantle 5 of thermoplastic material surrounding and in contact with the tendon along its length. Additionally, the sheathed tension element 1 comprises tension transmitting means 7 comprising circumferential corrugations on the lateral surface of the mantle 5 and an insulating material 9 that envelops the lateral surface of the mantle 5. It should be noted that FIG. 1 is not drawn to scale and that no relationship as to the relative sizes of the various elements of the tension element should be inferred from this figure. The same should be noted with respect to each of the other figures described or depicted herein.

Figure 2:
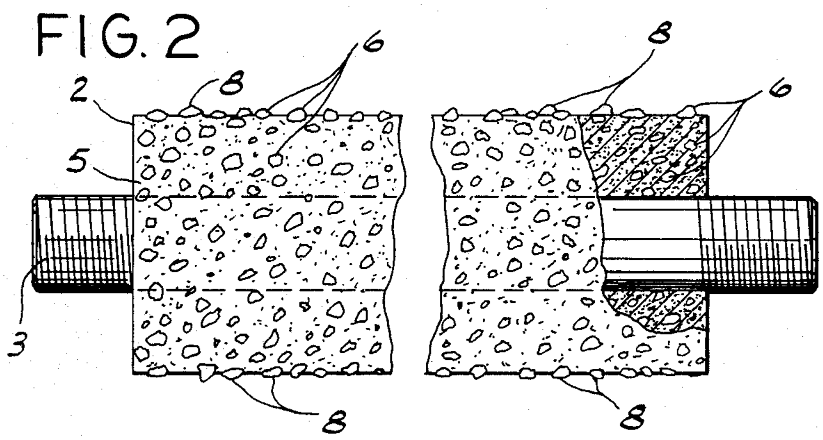
FIG. 2 is a side elevation with part broken away to show the interior of an alternative embodiment of the tension element of the present invention.

FIG. 2 is a side elevation with part broken away to show the interior of an alternative embodiment of the tension element of the present invention. The tension element 2 comprises a tendon 3 and a mantle 5 of thermoplastic material containing an aggregate 6, wherein the aggregate 6 forms irregularities 8 on the lateral surface of the mantle 5.

Figure 3:
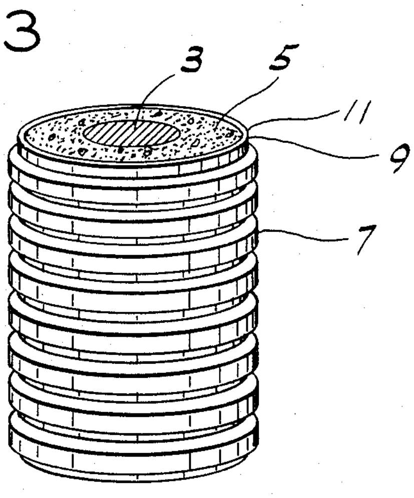
FIG. 3 is a perspective of a sheathed tension element of the present invention.

FIG. 3 is a perspective of the sheathed tension element depicted in FIG. 1.

Figure 4:
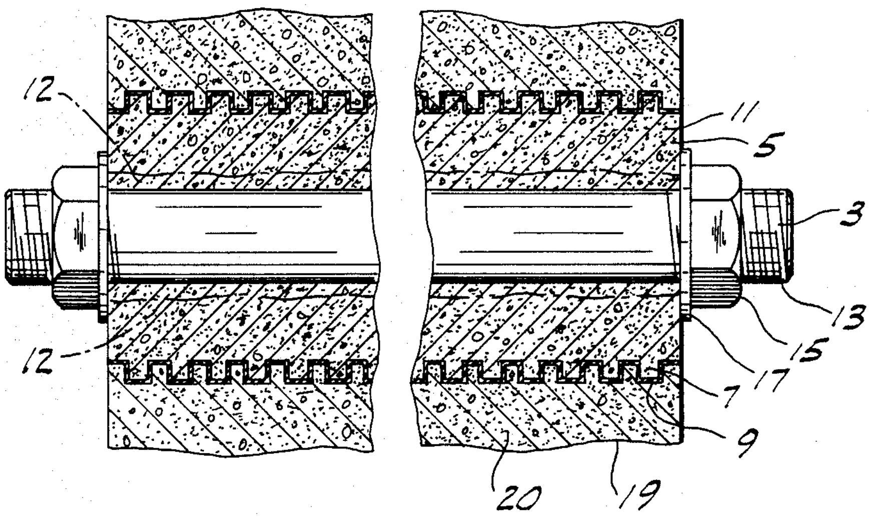
FIG. 4 is a sectional elevation of a posttensioned body comprising a mass of plastic material and a sheathed tension element of the present invention.

FIG. 4 depicts a sheathed tension element 11 of the present invention that is embedded in a body 19 comprising a mass of plastic material. The construction of FIG. 4 may be formed by placing a prefabricated sheathed tension element 11 comprising a tendon 3 encased in a mantle 5 of thermoplastic material in the forms (not shown) for the body 19, pouring the plastic material 20 about the sheathed tension element 11 and allowing the plastic material to harden. Thereafter, the body 19 may be posttensioned by heating the tendon 3 until the thermoplastic material of the mantle 5 adjacent the tendon softens sufficiently to permit the tendon to move freely in the axial direction. As the temperature of the tendon nears the melting point of the thermoplastic material, the thermoplastic material begins to melt, thus forming a melt zone 12 in the annular area surrounding the tendon. When the thermoplastic material is sufficiently softened, a tractive force (not shown) is applied to the tendon 3 until the desired tensile stress is achieved. Thereafter, the tendon is secured to the body 19 in a manner that causes the tensile force in the tendon to produce a compressive stress in the body. Here the tendon 3 is depicted as being secured to the body 19 by means of a nut 15 and washer 17; other means for securing the tendon to the body in a manner that causes the tensile force in the tendon to produce a compressive stress in the body will be apparent to those skilled the in art. After the tendon is secured to the body, the tension transmitting means 7 facilitate the transmission of tension from the tendon to the body.

Slabs comprising sulfur concrete are constructed in a manner similar to conventional concrete slabs. The rebars and tensioning elements are laid in place in the forms for the slab, the sulfur concrete is poured into the forms and then allowed to harden. Preferably, care is taken so that the tensioning elements are as straight as possible so that there is not a significant amount of excess tendon length trapped in the concrete in the form of a bend or bow. Because the surface of sulfur concrete is conventionally finished from the sides, however, each individual pour is preferably not wider than about 8–10 feet and no longer than about 20–30 feet. Thus, sulfur concrete structures having widths substantially greater than about 8–10 feet or lengths substantially greater than about 20–30 feet may be poured in sections in a checkerboard fashion, that is, the concrete structure is subdivided into a reticulate pattern of forms and the sulfur concrete is first poured into a first set of sections defined by the forms wherein the first set of sections consists of sections that contact each other only at the nodes of the reticulate pattern and after the first set of sections harden, the remaining sections are poured. Thus, for instance, the concrete structure may be subdivided into a rectilinear reticulate pattern of forms and the sulfur concrete is first poured into a first set of sections that consists of sections that are positioned diagonally to each other and after these sections harden, the sulfur concrete is poured into the remaining sections. This arrangement provides dimensional control by avoiding the cumulative effect of shrinkage on curing. After the forms are stripped off the first set of sections, a joint sealing mastic is preferably applied to the edges about to receive the next pour. Thus, concrete structures consisting of a plurality of sections may be posttensioned as a whole, or alternatively may consist of a plurality of sections each of which is individually posttensioned. Additionally, when slabs are poured in a checkerboard manner, and the slab is to be posttensioned as a whole, the tendon in the open sections between pours becomes taut. This prestress helps keep the tendon in place and reduces the degree of extension occurring when the tendon is posttensioned.

Figure 5:
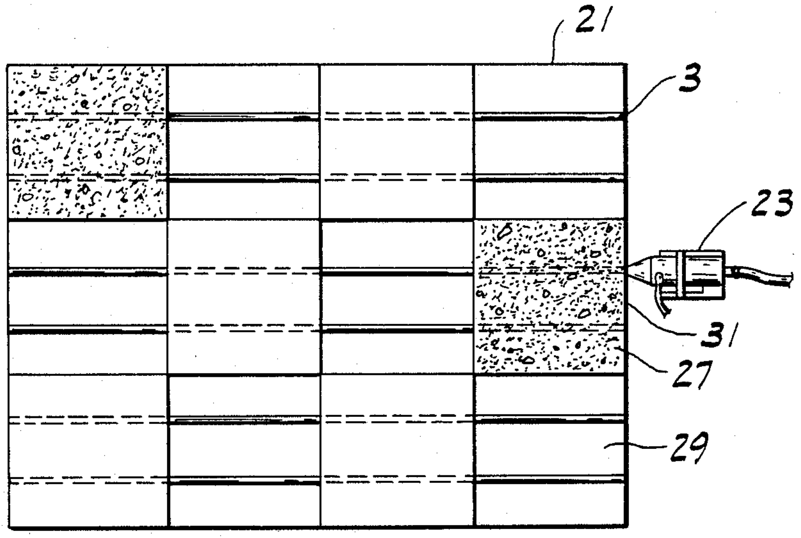
FIG. 5 is a plan view of a concrete structure poured in checkerboard fashion being posttensioned by a special jack anchored against the end of the concrete.

FIG. 5 depicts a slab of sulfur concrete 21 consisting of a plurality of sections, one-half of which have been poured in a checkboard manner, i.e., the poured sections 27 are positioned diagonally to each other. After the poured sections 27 have hardened, the remaining sections 29 are poured. In accordance with the present invention, tendons 3 are placed in the forms (not shown) before the sulfur concrete is poured. After all of the sections 27 and 29 are poured and hardened, the slab of sulfur concrete 21 may be posttensioned in accordance with the present invention by means of a special jack 23 (shown schematically) that is anchored against the end 31 of the slab of sulfur concrete 21.

Accordingly, the method of the present invention can be used in a variety of applications. For instance, Portland cement bodies or concrete slabs used in roads, buildings or other constructions may be conveniently posttensioned when the body comprises a tension element of the present invention. Cement or concrete bodies comprising a tension element of the present invention are fabricated by placing the tension element in the forms, pouring the concrete or cement around the tension element and allowing it to harden. Posttensioning may then be performed according to the process of the present invention.

As various changes could be made in the above methods and products, without departing from the scope of the invention, it is intended that all matter contained in the above description or shown in the accompanying drawings shall be interpreted as illustrative and not in a limiting sense.

What is claimed is:

1. A method of producing a compressive stress in a mass comprised of plastic material having a tendon therein, at least a portion of the length of the tendon being contained in sulfur concrete within the mass, the method comprising the steps of:

heating the tendon to a temperature sufficient to melt the sulfur concrete in an annular region surrounding the tendon, thereby creating a melt zone, controlling the heating of the tendon so that the annular thickness of the melt zone does not exceed one-half the mean lateral dimension of the large aggregate in the sulfur concrete surrounding the tendon, applying a tractive force to the heated tendon, thereby placing the heated tendon under tensile stress, until the tensile stress of the tendon reaches approximately 80% of the yield stress of the tendon and securing the heated tendon to the mass in a manner that causes the tensile force in the tendon to produce a compressive stress in the mass.

2. A method as set forth in claim 1 wherein the tendon is heated to a temperature in the range of about 245° F. to about 325° F.

3. A method as set forth in claim 1 wherein the tendon is heated to a temperature in the range of about 275° F. to about 290° F.

4. A method as set forth in claim 1 wherein the tendon comprises a reinforcing bar, cable or pipe.

5. A method as set forth in claim 1 wherein the tendon comprises a resiliently stretchable material.

6. A method as set forth in claim 1 wherein the tendon is encased within a mantle comprised of a sulfur concrete, the mantle having means on the lateral surface thereof for transmitting the tensile force in the tendon to the mass, the tension transmitting means comprising aggregate projecting outwardly beyond the lateral surface of the mantle.

7. A tension element for prestressing a mass of plastic material, the element comprising an elongate tendon encased in a solid mantle of sulfur concrete, the lateral surface of the mantle having tension transmitting means thereon comprising corrugations or irregularities in the lateral surface of the mantle resulting from the presence of aggregate for transmitting the tensile force in the tendon to the mass, the sulfur concrete of the mantle having a melting temperature substantially less than the melting temperature of the tendon such that when the tendon is heated to a temperature in excess of the melting temperature of the sulfur concrete of the mantle, the mantle softens in an annular region surrounding the tendon thereby permitting the tendon to move freely in the axial direction with respect to the tension transmitting means.

8. A tension element as set forth in claim 7 wherein the tendon comprises a reinforcing bar, cable or pipe.

9. A tension element as as set forth in claim 7 wherein the sulfur concrete has a melting temperature in the range of about 245° F. to about 325° F.

10. A tension element as as set forth in claim 7 wherein the sulfur concrete has a melting temperature in the range of about 275° F. to about 290° F.

11. A tension element as set forth in claim 7 wherein the tendon comprises a resiliently stretchable material.

12. A tension element as set forth in claim 7 wherein the mantle further comprises a sheath of insulating material on its lateral surface.

13. A tension element as set forth in claim 12 wherein the insulating material comprises polyethylene tape.

14. A prestressed plastic body comprising sulfur concrete and a tension element comprising a tendon, the tendon being encased in a solid mantle of sulfur conrete, the lateral surface of the mantle having tension transmitting means thereon comprising corrugations or irregularities in the lateral surface of the mantle resulting from the presence of aggregate for transmitting the tensile force in the tendon to the mass, the sulfur concrete of the mantle having a melting temperature substantially less than the melting temperature of the tendon such that when the tendon is heated to a temperature in excess of the melting temperature of the sulfur concrete of the mantle, the mantle softens in an annular region surrounding the tendon thereby permitting the tendon to move freely in the axial direction with respect to the tension transmitting means, the tendon being under a tensile stress in excess of eighty percent of the yield stress of the tendon.

* * * * *